United States Patent [19]

Ogura et al.

[11] Patent Number: 5,046,911

[45] Date of Patent: Sep. 10, 1991

[54] TRAY SUPPLY APPARATUS

[75] Inventors: Naoyuki Ogura; Takami Aono, both of Hamamatsu, Japan

[73] Assignee: Tenryu Technics Co., Ltd., Shizuoka, Japan

[21] Appl. No.: 474,362

[22] Filed: Feb. 2, 1990

[30] Foreign Application Priority Data

Feb. 3, 1989 [JP] Japan .............................. 1-11921[U]

[51] Int. Cl.$^5$ .......................................... H05K 13/02
[52] U.S. Cl. .................................. 414/331; 414/799; 198/475.1
[58] Field of Search ........................... 198/475.1, 799; 414/331, 752

[56] References Cited

U.S. PATENT DOCUMENTS

| 2,000,417 | 5/1935 | Perry et al. | 198/799 |
| 2,190,783 | 2/1940 | Hardy | 198/799 |
| 2,369,840 | 2/1945 | Nalbach et al. | 198/799 |
| 2,886,166 | 5/1959 | Lens | 198/799 |
| 4,465,177 | 8/1984 | Dorner | 198/475.1 |
| 4,877,121 | 10/1989 | Yamashita et al. | 198/475.1 |
| 4,886,412 | 12/1989 | Wooding et al. | 414/752 X |

FOREIGN PATENT DOCUMENTS 845774 8/1960 United Kingdom ................ 198/799

Primary Examiner—Robert J. Spar
Assistant Examiner—Brian K. Dinicole
Attorney, Agent, or Firm—Rodman & Rodman

[57] ABSTRACT

A tray supply apparatus for supply trays each accommodating therein articles such as electronic components, to an article withdrawal position. Tray pallets having trays mounted respectively thereon move along an endless transport path by a plurality of arms mounted to a pair of endless chains moving vertically along the endless transport path, while the tray pallets are always maintained at their predetermined posture. When each of the tray pallets reaches a position at the uppermost portion of the endless transport path, the articles are picked up from the tray on the tray pallet by suction and are taken out.

6 Claims, 6 Drawing Sheets

TRAY SUPPLY APPARATUS

BACKGROUND OF THE INVENTION

1. Field of the Invention

The present invention relates to tray supply apparatuses and, more particularly, to a technique which is effective in use for supplying a plurality of trays each accommodating therein a plurality of articles such as electronic components, to an article withdrawal position.

2. Related Art Statement

Conventionally, there are known systems for supplying a plurality of trays each accommodating therein a plurality of articles such as electronic components, to an article withdrawal position. In almost all of the systems, the trays each accommodating the articles within partitioned or divided spaces in the form of a lattice are stacked upon each other. The articles are successively taken out from the uppermost tray. The trays, which are emptied, are successively discharged.

On the other hand, as another conventional system, there is also known a system in which a plurality of pallets accommmodated in a rack are optionally selected and are moved to an article withdrawal position.

In the former conventional systems, however, the trays cannot be discharged until the articles are all taken out. Further, naturally, it is impossible and meaningless to return the trays, from which the articles have once been discharged, to their respective original positions. Nevertheless, in the actual operation, there are many cases where it is necessary to optionally supply the articles which are of many kinds or types. In order to cope with this requirement or demand by the former conventional system, tray supply apparatuses corresponding in number to the kinds of the articles must be used in parallel relation to each other. Thus, not only the cost of equipment increases, but also a large amount of space is required. There may be a case where it is impossible to establish the tray supply apparatuses because of insufficient space.

Further, the later conventional system has been proposed to avoid drawbacks of the former conventional systems. In the latter conventional system, however, sudden or abrupt acceleration and deceleration, vibration, impact and the like are applied to the tray pallets at transportation thereof, whereby the article rebounds from each partitioned space in the tray within the tray pallet, or a shift or deviation in position of the articles occurs: Thus, automatic withdrawal operation of the articles are made impossible, drawbacks occur such as breakage due to collision, and the like. In order to eliminate such drawbacks, the following problems occur derivatively. That is, the construction is made complicated, and manufacturing is made troublesome or cumbersome, so that the cost increases.

SUMMARY OF THE INVENTION

It is an object of the invention to provide a tray supply apparatus capable of optionally supplying a plurality of tray pallets to an article withdrawal position by the single tray supply apparatus.

It is another object of the invention to provide a tray supply apparatus whose construction is correlated as a whole from a drive source to a plurality of tray pallets, so that the tray supply apparatus is capable of smoothly supplying a plurality of trays without occurence of impact accompanied with movement of the tray pallets.

It is still another object of the invention to provide a tray supply apparatus which has simple construction, is easy to manufacture, and is low in cost.

It is further object of the invention to provide a tray supply apparatus which is compact so that only small installation space is needed.

The above and other objects and novel features of the present invention will become more apparent when referred to the following descriptions given in conjunction with the accompanying drawings.

Of various inventions disclosed in this application, summary of typical ones will be described briefly as follows.

That is, a tray supply apparatus according to the invention comprises:

a pair of support means arranged in facing relation to each other in an offset manner, one of the pair of support means having its inward side which is opposite to that of the other support means;

two pairs of sprockets associated respectively with the pair of support means, each pair of sprockets being rotatably arranged respectively at upper and lower portions of a corresponding one of the pair of support means;

a pair of endless transmission means extending respectively between the two pairs of sprockets;

a plurality of arms having their respective one ends which are mounted to the inward sides of the respective endless transmission means in a rotatably movable manner, the arms is respective pairs being spaced a predetermined spacing from each other; a plurality of shafts extending in a direction in which said pair of support means face toward each other, each of said shafts combining respective pair of adjacent arms, said one ends of which are mounted to the endless transmission means at different positions, at their respective other ends in an angularly movable manner;

a plurality of tray pallets supported, in an rotatably movable manner, by some of the shafts mounted to the other ends of corresponding pairs of arms mounted to one of the pair of endless transmission means, and by the remaining shafts mounted to the other ends of the remaining pairs of arms mounted to the other endless transmission means, so as to always maintain a predetermined posture; and drive means for rotatively driving the pairs of sprockets synchronously.

According to the tray supply apparatus of the invention, the tray pallets can successively supply the trays to the article withdrawal position, while the pair of endless transmission means move along the endless transport path. Thus, if the tray accommodating therein the articles different in type or kind from each other is mounted on each tray pallet as occasion demands, the plurality of kinds of articles can be supplied by the single supply apparatus.

In that case, the tray pallets move smoothly along the endless transport path, while always maintaining their predetermined posture by the pair of endless transmission means, pairs of adjacent arms and the shafts. Thus, it is possible to prevent occurrence of impact with respect to the articles, shift or deviation in position of the articles, and so on.

DETAILED DESCRIPTION OF THE PREFERRED EMBODIMENTS

Figure 1A:
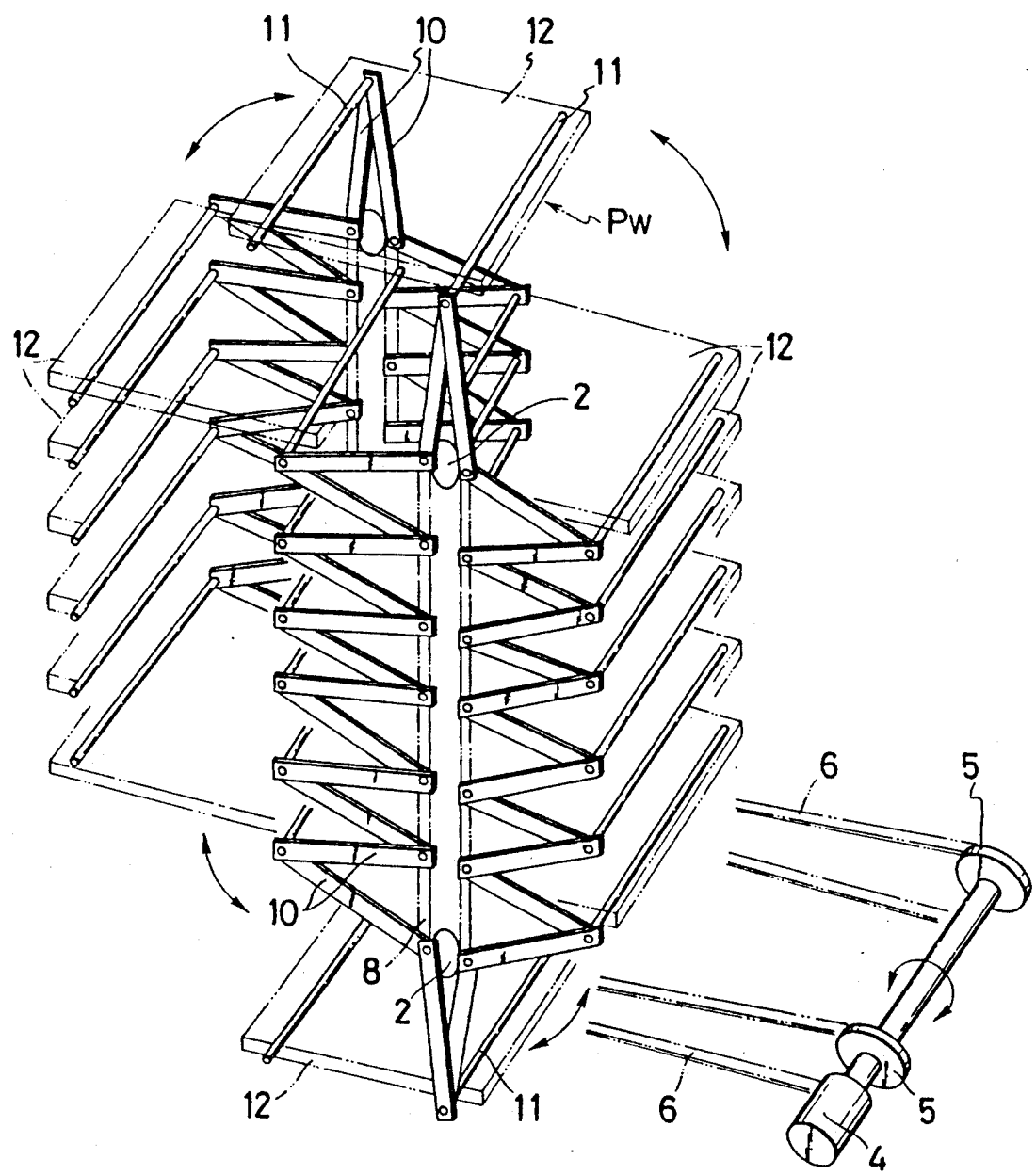
FIG. 1A is a schematic perspective view of a tray supply apparatus according to an embodiment of the invention.

Referring first to FIGS. 1A through 3, there is shown a tray supply apparatus according to an embodiment of the invention. The tray supply apparatus comprises a pair of support plates 1 and 1 serving as a pair of support means, which are fixedly mounted vertically to a chassis or base (not shown). The pair of support plates 1 and 1 are arranged in facing relation to each other in an upstanding manner and in a staggered or offset manner.

Each of the pair of support plates 1 has its inward side which faces toward that of the other support plate 1. Respectively at upper and lower locations on the inward side of the support plate 1, a pair of sprockets 2 and 2 are arranged rotatably in a vertical plane together with their respective sprocket shafts 3.

Rotational driving force is transmitted to the lower sprockets 2 and 2 from a motor 4 serving as a drive source, through respectively pulleys 5, endless belts 6 and pulleys 7.

A pair of endless chains 8 and 8 serving as a pair of endless transmission means are provided each of which extends between and is wound, as a endless chain construction, about the pair of sprockets 2 and 2 which are arranged respectively at the upper and lower locations of a corresponding one of the pair of support plates 1 and 1. The rotational driving force from the motor 4 drives the two pairs of sprockets 2 and 2 and the pair of chains 8 and 8 together. Each of the chains 8 moves in an endless loop along an endless transport path about the corresponding pair of sprockets 2 and 2. In this case, the two sets of the pair of sprockets 2 and 2 and the chain 8, which are provided for the respective support plates 1 and 1, are driven together synchronously at their respective speeds which are the same as each other.

Each of the pair of chains 8 and 8 has its inward side which faces toward that of the other chain 8. A plurality of pins 9 are mounted to the inward side of the chain 8 in a projecting manner and are spaced a predetermined spacing from each other. These pins 9 may be ones in which a plurality of hollow link pins (not shown) are provided to each of the pair of chains 8 and 8, and the pins 9 project inwardly respectively from the link pins of the chain 8. Of course, a construction may, for example, be such that the hollow link pins per se project inwardly from the chain 8. Further, not on the side of the chain 8, but the link pins may be provided respectively on one ends of a plurality of arms 10 in a projecting manner. Alternatively, pin inserting bores may be formed in the chain 8 and the arms 10 so that separate pins are inserted respectively in the pin inserting bores to connect the chain 8 and the arms 10 to each other in an angularly movable manner.

By the pins 9, the one ends of the respective adjacent arms 10 are mounted in pairs to the chain 8 in an angularly movable manner.

On the other hand, each arms 10 have their respective other ends which are connected to another adjacent arms 10 each other in an angularly movable manner by a corresponding one of a plurality of shafts 11 which extend perpendicularly inwardly.

Figure 1B:
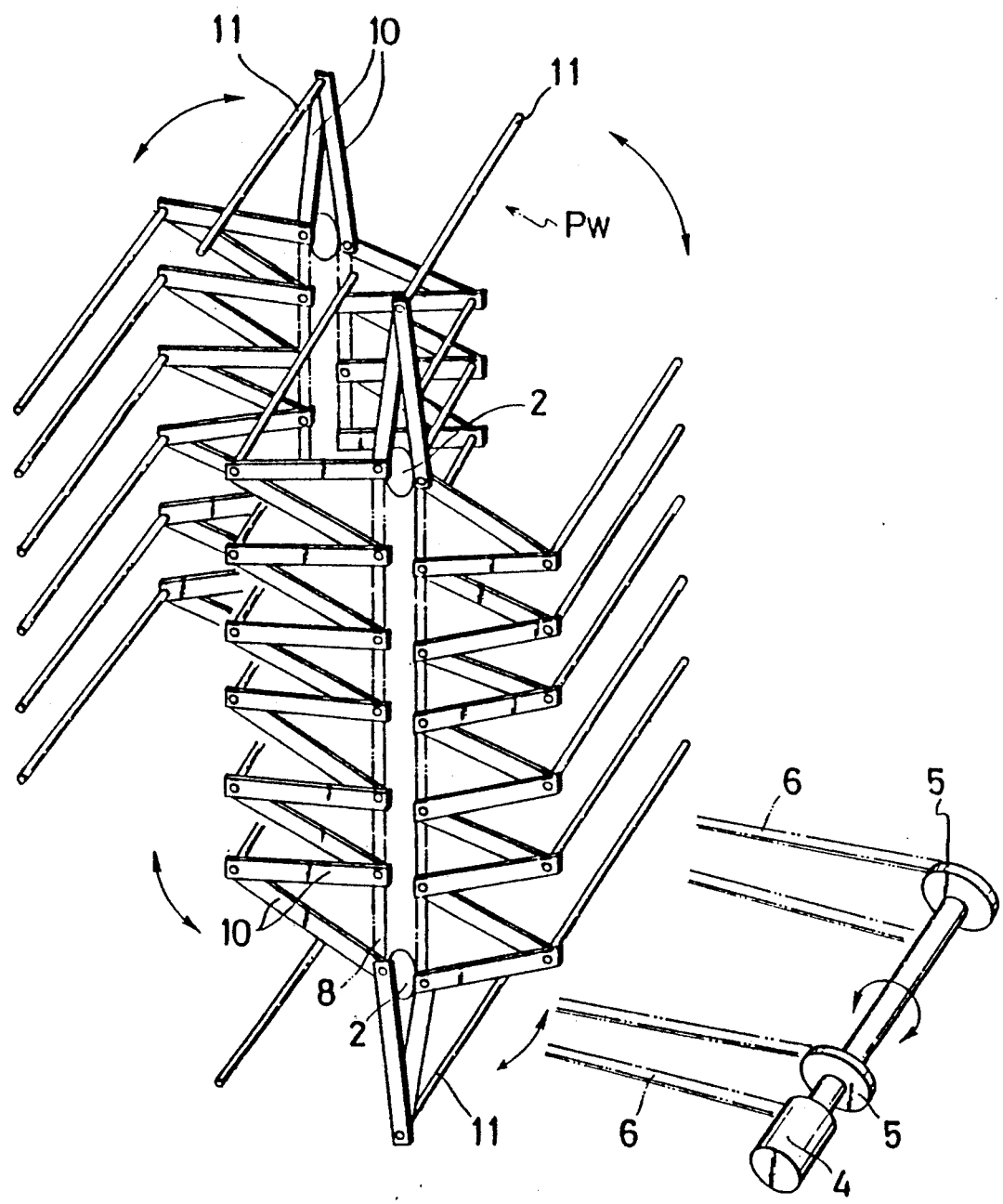
FIG. 1B is a schematic perspective view of the tray supply apparatus illustrated in FIG. 1A with the trays removed.
Figure 2:
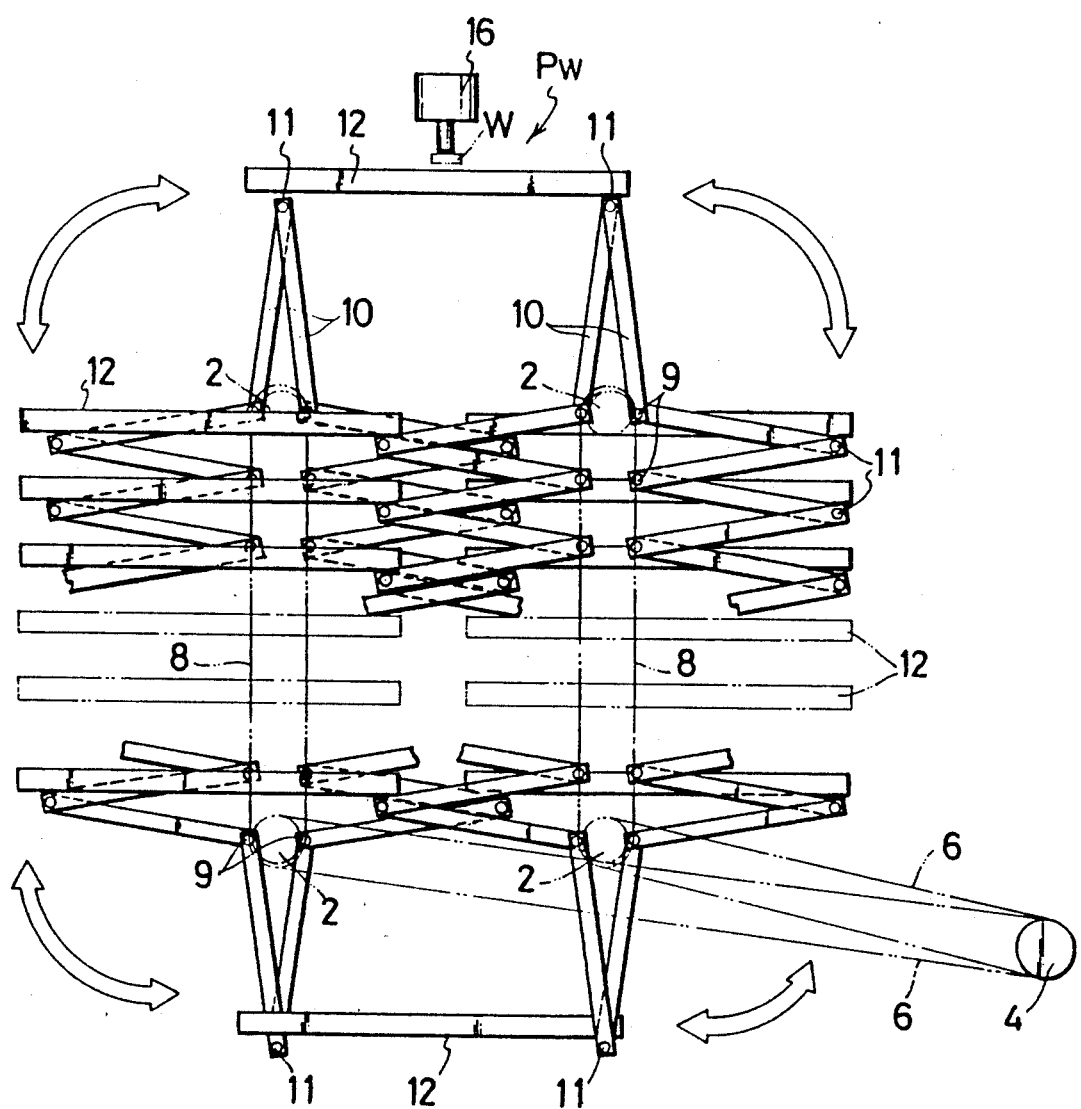
FIG. 2 is a front elevation view of the tray supply apparatus illustrated in FIG. 1A.

Accordingly, as will be apparent from FIGS. 1 and 2, a portion of the chain 8 and each pair of adjacent arms 10 cooperate with each other to form a link construction in the form of an isosceles triangle. Each arms 10 are angularly movable about the pins 9 and the shaft 11 at the respective corners of the isosceles triangle with respect to the chain 8 and other arms 10.

Figure 7:
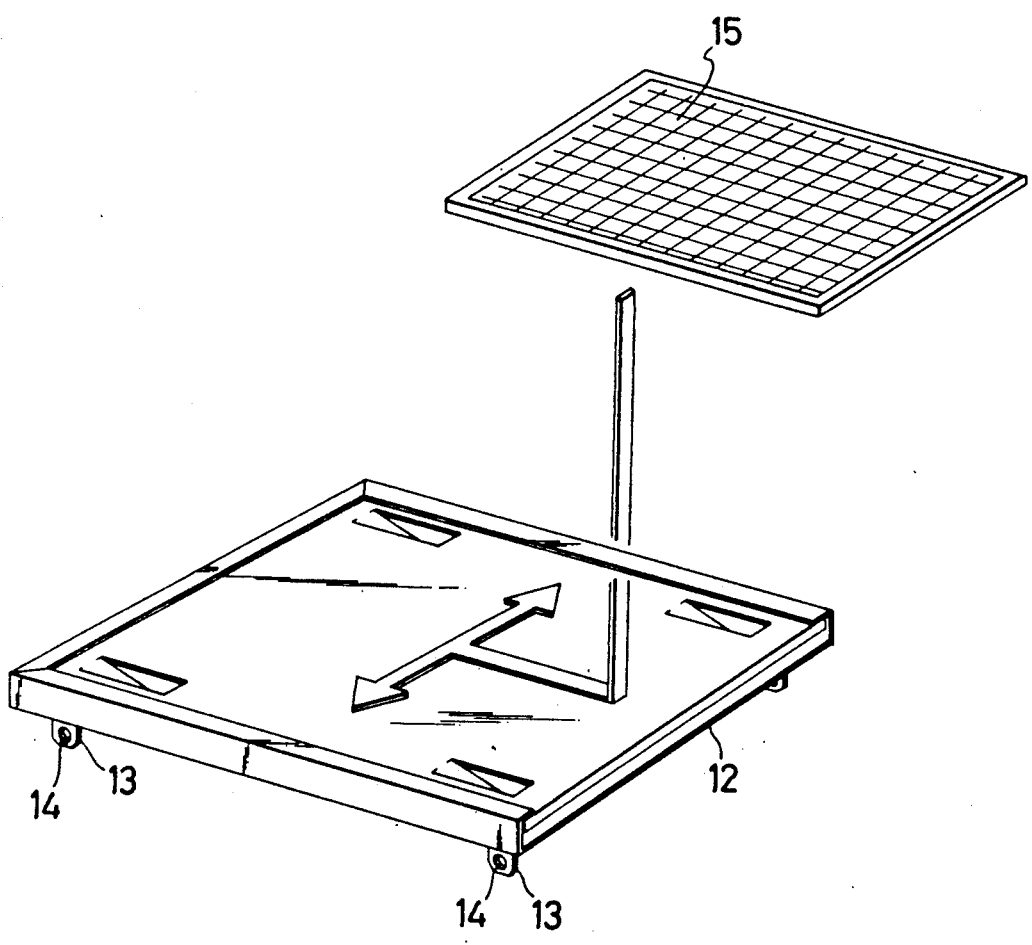
FIG. 7 is an exploded perspective view showing a relationship between the tray pallet and the tray.

As shown in FIGS. 1A through 3, two pairs of shafts 11 and 11 at corresponding positions with respect to each sets of the pair of sprockets 2 and 2 and the chain 8, i.e. total four shafts 11, cooperate so that each two shafts, one after the other, are to be inserted to respective shaft inserting bores 14 (FIG. 7) of brackets 13 provided at the undersides of both ends (left-hand and right-hand ends viewed in FIGS. 1A through 3) of respective tray pallet 12 in a rotatable manner.

Figure 3:
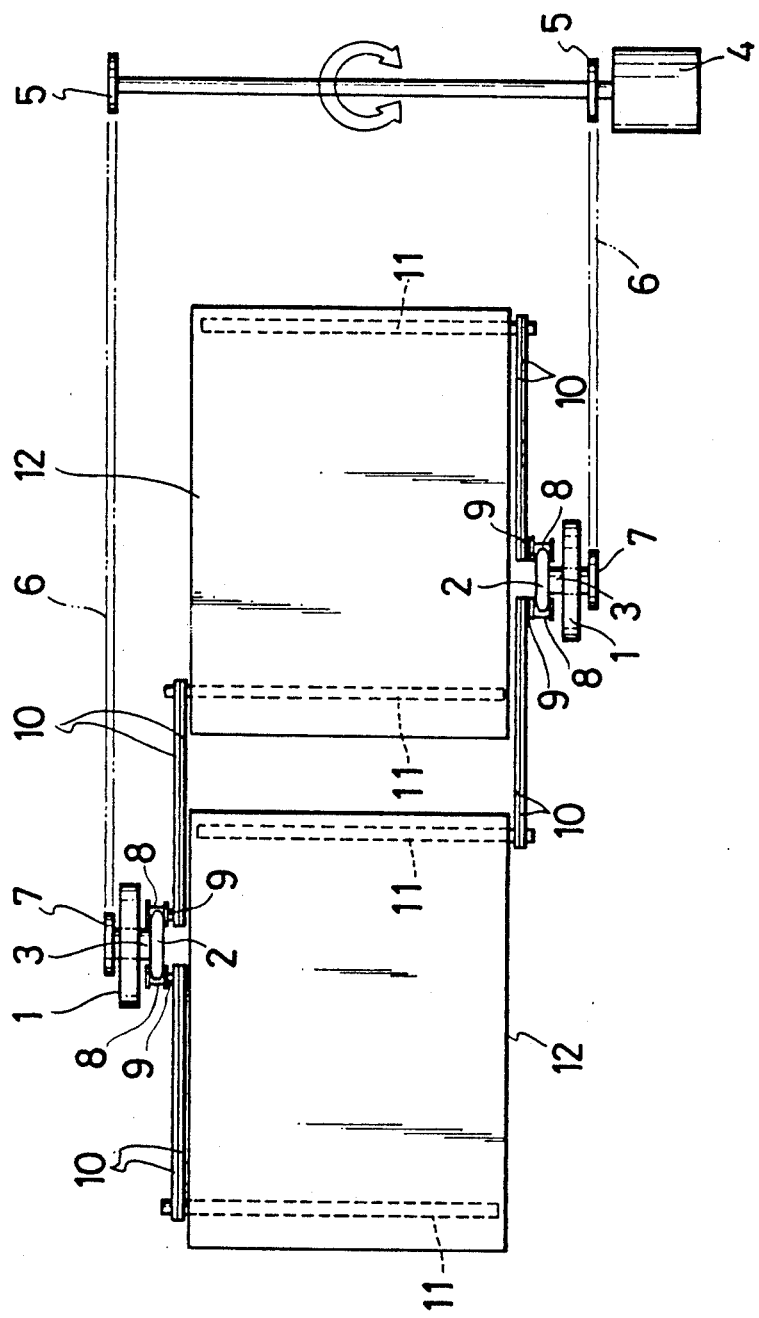
FIG. 3 is a top plan view of the tray supply apparatus illustrated in FIG. 1A.

In other words, as viewed in FIG. 3, a tray pallet 12 is mounted to two shafts 11, each shafts being inserted from opposed directions into the respective shaft inserting bores 14 of the brackets 13 at both ends of the tray pallet 12. One of these two shafts 11 extends from forward ends, i.e. free ends, of two arms 10 and 10 to the top side viewed in FIG. 3, these arms 10 and 10 themselves extending from the sprocket 2 in the bottom side viewed in FIG. 3. The other shaft 11 extends from forward ends of two arms 10 and 10 to the bottom end viewed in FIG. 3, these arms extending from the sprocket 2 in the top side viewed in FIG. 3. Thus, two tray pallets 12 are mounted by two pairs of shafts 11, each tray pallet 12 being mounted in a rotatable manner to two shafts 11 out of four, one after the other, extending from opposed direction.

Accordingly, each of the tray pallets 12 is ensured to be supported by the two shafts 11 and 11. These two shafts 11 and 11 move synchronously with each other along endless transport path, accompanied with synchronous operation of each chain 8. Thus, each tray pallet 12 is moved in the clockwise or counterclockwise direction, while the tray pallet 12 always maintains its horizontal posture.

In the endless transport path for the tray pallets 12, a position, at which the tray pallet 12 reaches the uppermost position above the upper sprockets 2 and 2, is an article withdrawal position PW in which articles W are taken out from the tray 15 mounted within the tray pallet 12, by picking-up due to a suction cup, for example, as shown in FIG. 2. An article withdrawal device 6 is arranged at the article withdrawal position PW.

Figure 4:
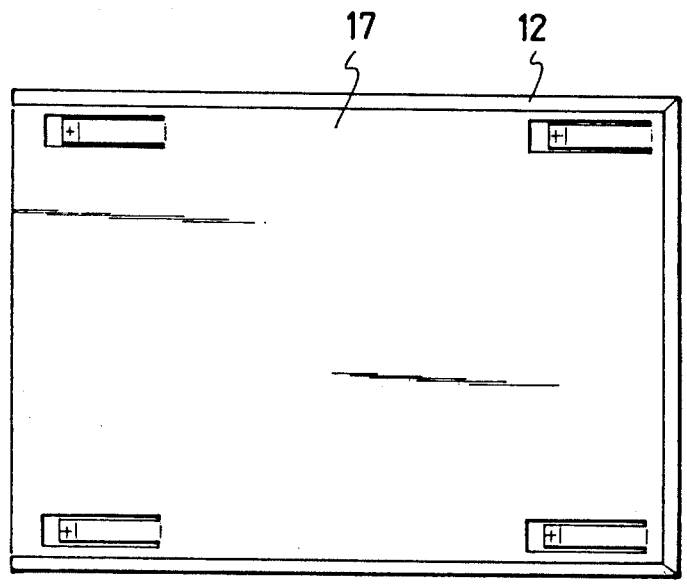
FIG. 4 is a top plan view of an example of one of a plurality of tray pallets which are used in the invention.
Figure 5:
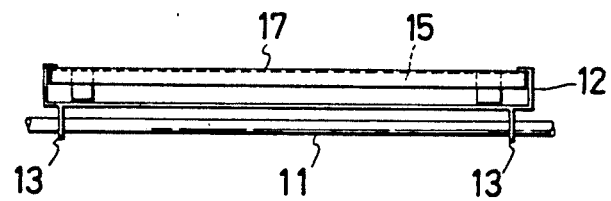
FIG. 5 is a side elevational view of the tray pallet illustrated in FIG. 4.
Figure 6:
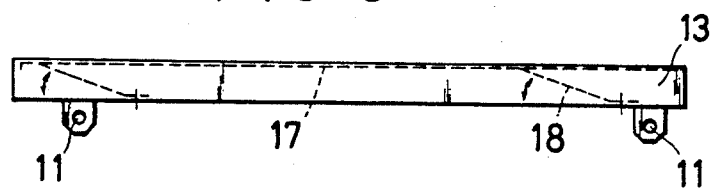
FIG. 6 is a front elevational view of the tray pallet illustrated in FIG. 4.

In connection with the above, as shown in FIGS. 4 through 6, a clamp plate 17 is arranged on the tray pallet 12. Further, four leaf springs 18 are arranged on the bottom of the tray pallet 12, for elastically biasing the tray 15 against the lower face of the clamp plate 17 to hold the tray 15.

The operation of the embodiment will next be described.

First, the trays 15 each accommodating therein desirable articles W are mounted respectively on the tray pallets 12 of the tray supply apparatus. In this connection, the trays 15 can accommodate articles W the same in kind or type as each other or different in type or kind from each other tray by tray.

Under this condition, the motor 4 is driven to rotatively drive synchronously the two pairs of sprockets 2 and 2 and the pair of chains 8 and 8 in the clockwise or counterclockwise direction through the pulleys 5, the belts 6, the pulleys 7 and the sprocket shafts 3, such that two pairs of sprockets 2 and 2 and the pair of chains 8 and 8 move at the same speed.

By the driving of the pair of chains 8 and 8, each tray pallet 12 moves in a loop manner along the endless transport paths of the chains 8 and 8, while the tray pallet 12 always maintains its horizontal posture.

That is, in case, for example, where the moving direction of each of the chains 8 is the clockwise direction, the tray pallet 12 at the upper end of the group of tray pallets associated with the chain 8 on the left-hand side as viewed in FIG. 2 moves arcuately toward the right upper location in FIG. 2, so that the tray pallet 12 moves to the uppermost position, that is, to the article withdrawal position Pw. On the other hand, the tray pallet 12, which has previously been in the article withdrawal position Pw, moves arcuately toward the upper end of the chain 8 on the right-hand side in FIG. 2.

At this time, it is usual that, in agreement with the article withdrawal operation from the trays 15 of the tray pallets 12, the pair of chains 8 and 8 are moved intermittently so as to successively move the tray pallets 12 one by one to the article withdrawal position Pw. That is, returning to the aforesaid example, as to transport one tray pallet 12, the tray pallet 12 at the upper end of the group of tray pallets associated with the chain 8 on the left-hand side as viewed in FIG. 2 is moved to the article withdrawal position Pw.

Of course, the pair of chains 8 and 8 may be controlled to rotate in the counterclockwise direction or to stop, in addition to the clockwise direction. Accordingly, by selecting the rotating direction of chains 8 and 8, the tray pallet 12 having mounted thereon the articles W of desired kinds can move to the article withdrawal position Pw for a shortest distance or for a shortest period of time.

The articles W accommodated in the tray 15 of the tray pallet 12 transported or delivered to the article withdrawal position Pw are picked up, for example due to the suction force, by the article withdrawal device 16, and are transported to a desired location.

After completion of withdrawal of the articles W from the tray 15, the tray pallet 12 having mounted thereon the tray 15 is moved rotatively in a desired direction by the motor 4, whereby the tray pallet 12 is rotatively moved synchronously at the same speed as other tray pallets 12 so that another tray pallet 12 successively moves to the article withdrawal station Pw.

According to the embodiment, it is possible to supply the plurality of tray pallets 12 to the article withdrawal position Pw at will by means of the single tray supply apparatus. Accordingly, by making the kinds or types of the articles W accommodated in the tray 15 mounted on the tray pallet 12 different from each other, it is possible to supply the articles W of desired kinds at will. In other words, it is possible to selectively supply the articles W of multiple kinds or types in compliance with an operator's desire or request, by the single tray supply apparatus. Of course, the articles W of the same kind or type may be accomodated in all of the plurality of trays 15.

Further, the tray supply apparatus according to the embodiment is of construction in which all components are connected as a whole from the motor 4 to the tray pallets 12. Accordingly, the tray pallets 12 move along the endless transport path smoothly together with rotation or angular movement of the pair of chains 8 and 8 by the motor 4. Thus, abrupt acceleration and deceleration, vibration, impact and so on are not. applied to the tray pallets 12 during movement thereof, so that it is possible to prevent the articles W from rebounding away from the partitioned spaces of each tray 15, to prevent shift or deviation in position of the articles W from occurring, and so on.

The present invention has been described specifically on the basis of the embodiment. However, the invention should not be limited to the above embodiment. It is needless to say that the invention may be modified or varied in various manners within the scope of the invention.

For instance, the articles may be taken out from each tray by any systems other than the suction cup.

Further, the moving posture of the tray pallets is not limited to the horizontal posture.

The above description is made to a case in which the present invention is applied to supply of electronic components such as IC, LSI and the like. However, the invention should not be limited to this specific application. For example, the invention may be applied to supply of other electronic components.

Advantages obtained by typical ones of the inventions disclosed in this application will be described briefly as follows.

(1) It is possible to supply the plurality of tray pallets to the article withdrawal position at will by the single tray supply apparatus. When trays accommodate therein the articles different in kind or type from each other in the tray pallet, it is possible to supply the plurality of kinds of articles by the single apparatus.

(2) Since the construction is connected as a whole from the driving source to the tray pallets, the tray pallets move smoothly along the endless transport path together with rotary movement of the transmission means, so that abrupt acceleration and deceleration, vibration, impact and so on are not applied to the tray pallets. Thus, it is possible to ensure that the articles are prevented from rebounding away from the partitioned space of the tray, and shift or deviation in position of the articles is prevented from occurring.

(3) By the aforesaid (2), there is no shift or deviation in position of the articles. Accordingly, automatic article withdrawal at the article withdrawal position can be ensured.

(4) The tray supply apparatus according to the invention is simple in construction. Accordingly, manufacturing is easy, and the cost is low.

(5) The tray supply apparatus according to the invention is compact in construction as a whole. Thus, the tray supply apparatus has such an advantage that it is sufficient to prepare a small installation space therefor. Further, as decribed in the above (1), since the plurality of kinds of articles can be supplied only by the singe apparatus, it is unnecessary to prepare exclusive apparatuses for the respective kinds of the articles.

What is claimed is:

1. A tray supply apparatus for supplying electronic components comprising, a pair of support means oppositely disposed and offset from each other, each of said support means having an inward side opposite the corresponding inward side of the other support means, and each of the support means having upper and lower portions;

two pairs of sprockets, each said pair associated respectively with each of said support means, each said pair of sprockets being rotatably arranged respectively at the upper and lower portions of respective said support means;

a pair of endless transmission means, one of said transmission means at each of said support means, each said transmission means extending between respective said pairs of sprockets to form a drive loop such that said transmission means is movable along a looped orbit in a vertical plane;

two groups of a plurality of arms, each said group of arms having opposite inner and outer ends, each of said arms of a respective said group being pivotally linked end to end in closed geometrical configuration such that the inner ends of consecutive arms of one group are paired and pivotally connected to a corresponding one of said transmission means the outer opposite end of each said arm is paired and pivotally connected to another consecutive arm and extends away from said corresponding transmission means;

two groups of a plurality of shafts, each said group of shafts corresponding to one of said support means, each shaft of a respective said group of shafts having one end pivotally joined to a pair of pivotally connected outer ends of said arms, the opposite end of said shaft having a cantilevered free end and extending in a horizontal direction toward the opposite support means such that said shaft is movable with one and only one of said transmission means, each shaft of the other said group of shafts having one end pivotally joined to a pair of pivotally connected outer ends of said arms in the other said group of arms, the opposite ends of said shafts in the other said group of shafts having cantilevered free ends and extending in a direction opposite the first direction toward the corresponding opposite support means such that the shaft of the second said group of shafts is movable only with the other of said transmission means;

a plurality of tray pallets each of which is supported by one shaft from each of said group of shafts, drive means for rotatably driving said pairs of sprockets synchronously such that said tray pallets are maintained in a predetermined posture, and each of said tray pallets is moved intermittently along said orbit of said endless transmission means between an uppermost position of said looped orbit and a lowermost position of said looped orbit;

a plurality of trays mounted respectively on said tray pallets and accommodating a plurality of electronic components therein; and, article withdrawal means positioned above said uppermost position of said looped orbit for withdrawing electronic components from one of said trays which is stopped at said uppermost position.

2. The tray supply apparatus according to claim 1 wherein, said pair of endless transmission means include a pair of endless chains which extend respectively between said two pairs of sprockets, and wherein, the paired inner ends of the respective arms are pivotally mounted to the opposite sides of said endless chains by respective pins such that consecutive paired inner ends are joined to said endless chains at a predetermined distance from each other.

3. The tray supply apparatus according to claim 1 wherein each pair of adjacent arms pivotally joined at said outer end have consecutive spaced inner ends pivotally joined to said endless transmission means to form a link construction in the form of an isosceles triangle whose respective corners are formed by the consecutive spaced inner ends of said arms and the pivotally connected outer ends of said arms, said inner and outer ends being movable pivotally with respect to said endless transmission means.

4. The tray supply apparatus according to claim 1 wherein the electronic components of the same or of different kinds are accommodated in said trays.

5. The tray supply apparatus according to claim 4, wherein:

said tray pallets move in a vertical plane along an endless transport path of said pair of endless transmission means, and wherein, said tray supply apparatus further includes work taking-out means arranged above an uppermost position of said endless transport path, for taking-out the works.

6. The tray supply apparatus according to claim 5, wherein:

said works are electronic components.

* * * * *